US007403205B2

(12) United States Patent
Zeng

(10) Patent No.: US 7,403,205 B2
(45) Date of Patent: Jul. 22, 2008

(54) FAST PRIMARY MAPPING AND GAMUT ADAPTATION TO CONSTRUCT THREE DIMENSIONAL LOOKUP TABLES

(75) Inventor: Huanzhao Zeng, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 532 days.

(21) Appl. No.: 11/117,859

(22) Filed: Apr. 29, 2005

(65) Prior Publication Data

US 2006/0244982 A1    Nov. 2, 2006

(51) Int. Cl.
*G09G 5/02* (2006.01)
(52) U.S. Cl. .................. 345/590; 345/597; 345/604; 382/167; 382/254; 347/15; 358/1.9
(58) Field of Classification Search ................. 345/590; 382/167, 254; 347/15
See application file for complete search history.

(56) References Cited

U.S. PATENT DOCUMENTS

| 6,014,457 | A  | 1/2000  | Kubo et al.   |
| 6,719,392 | B2 | 4/2004  | Qiao          |
| 6,765,586 | B2 | 7/2004  | Yamazaki et al. |
| 6,826,304 | B2 | 11/2004 | Levy et al.   |
| 6,859,551 | B2 | 2/2005  | Ohga          |
| 6,873,439 | B2 | 3/2005  | Levy et al.   |

FOREIGN PATENT DOCUMENTS

| EP | 0611230 | 8/1994 |
| EP | 0611231 | 8/1994 |
| EP | 1173004 | 1/2002 |

OTHER PUBLICATIONS

Montag, Ethan D. et al., "Gamut Mapping: Evaluation of Chroma Clipping Techniques for Three Destination Gamuts," Proceedings of the Sixth IS&T/SID.
Color Imaging Conference: Color Science, Systems, and Applications, pp. 57-61, (1998).
PCT International Search Report and Written Opinion of the International Searching Authority for International Application No. PCT/US2006/016910 mailed on Apr. 27, 2006 (11 pages).

*Primary Examiner*—Kimbinh T Nguyen

(57) ABSTRACT

Disclosed are embodiments of a system and method for rendering colors between color devices. The method includes establishing a source color gamut for a source device and the source color gamut has a white point, a black point, and primary points. The method also includes establishing a destination color gamut for a destination device, and the destination color gamut has a white point, a black point, and primary points. White and black point adaptation is performed to adapt the white and black points of the source color gamut to the white and black points of the destination color gamut, respectively. Neutral points from the source color gamut are processed to the destination color gamut without gamut mapping. Aimed primary points are determined from the adapted white and black points and from the source and destination primary points, the destination gamut, and color preference. Important lines are mapped from the source gamut to the destination gamut using the aimed primary points. Gamut surface points are mapped from the source gamut to the destination gamut using the important lines. Interior points of the source gamut surface are processed.

25 Claims, 11 Drawing Sheets

FAST PRIMARY MAPPING AND GAMUT ADAPTATION TO CONSTRUCT THREE DIMENSIONAL LOOKUP TABLES

CROSS-REFERENCE TO RELATED APPLICATIONS

This Patent Application is related to U.S. patent application Ser. No. 11/118,038 filed on even date herewith entitled FAST COLOR MAPPING USING PRIMARY ADJUSTMENT WITH GAMUT ADAPTATION, commonly assigned to the same assignee as the present invention, and hereby incorporated by reference herein.

BACKGROUND

The present invention relates generally to the field of color-image processing and more particularly to a system and method of adapting from one color gamut to another without gamut mapping every node in the color gamut.

Any color imaging device has its limit in reproducing color such that it cannot reproduce all color that exists. The range of color that a device produces is known as the color gamut of the device. Different devices have different color gamuts. In order to preserve similar color appearance when color is transferred from one device into another, such as from monitor to printer, gamut mapping is typically used. Many gamut-mapping methods and algorithms have been developed, and such methods improve the quality of color transformation in cross-media color reproductions.

In device color characterization, a multiple-dimensional lookup table is typically generated. For example, a three dimensional sRGB to CMYK lookup table can be generated for the transformation from monitor sRGB to printer CMYK. In an International Color Consortium (ICC) color management system, an ICC profile is generated for the color transformation for each setting mode of a color device. A three dimensional lookup table for the transformation from profile connection space ("PCS"), which is CIE LAB or XYZ in a specified illuminant and viewing condition, to CMYK for each rendering intent is included in an ICC profile for a printer CMYK ICC profile.

Gamut-mapping algorithms are typically used to gamut map colors point-by-point, that is, they gamut map every node of a lookup table or every pixel of an image. Because of the heavy computation involved in gamut mapping, the gamut mapping is generally not fast enough for real-time device color characterization. Such point-by-point gamut mapping will cause a "bottle-neck" for color management module implementation. Furthermore, in some instances point-by-point processing in gamut mapping can ignore the preservation of relative relationship of neighbor color, which is significant for preserving color appearance.

For these and other reasons, a need exists for the present invention.

SUMMARY

Exemplary embodiments of the present invention include a system and method for rendering color images between color devices. One embodiment of the method includes establishing a source color gamut for a source device and the source color gamut has a white point, a black point, and primary points. The method also includes establishing a destination color gamut for a destination device, and the destination color gamut has a white point, a black point, and primary points. White and black point adaptation is performed to adapt the white and black points of the source color gamut to the white and black points of the destination color gamut, respectively. Neutral points from the source color gamut are processed to the destination color gamut. Aimed primary points are determined from the adapted white and black points and from the source and destination primary points, the destination gamut, and color preference. Important lines are mapped from the source gamut to the destination gamut using the aimed primary points. Gamut surface points are mapped from the source gamut to the destination gamut using the important lines. Interior points of the source gamut surface are processed.

DETAILED DESCRIPTION

In the following Detailed Description, reference is made to the accompanying drawings, which form a part hereof, and in which is shown by way of illustration specific embodiments in which the invention can be practiced. It is to be understood that other embodiments can be utilized and structural or logical changes can be made without departing from the scope of the present invention. The following Detailed Description, therefore, is not to be taken in a limiting sense, and the scope of the present invention is defined by the appended claims.

Figure 1:
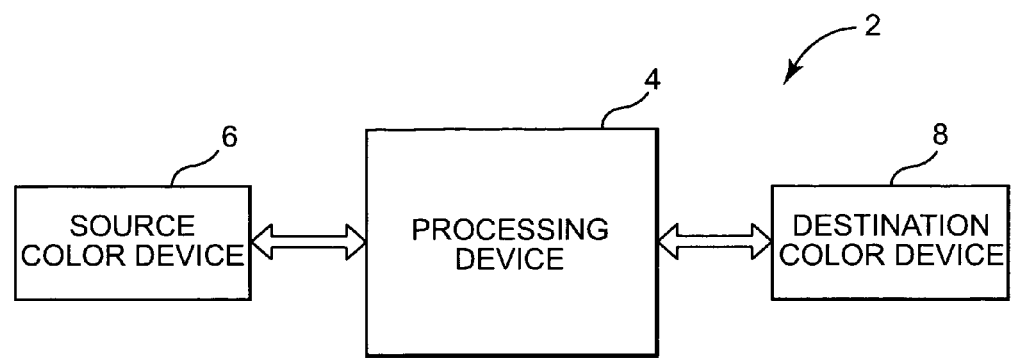
FIG. 1 illustrates a processing system with a source color device and a destination color device.

FIG. 1 illustrates processing system 2. Processing system 2 includes a processing device 4 and source color device 6 and destination color device 8. In one example, source and destination color devices 6 and 8 are a color monitor and a digital color printer, respectively. In other examples, source and destination color devices 6 and 8 are each color monitors, each color printers, a scanner and a monitor, a scanner and a printer and combinations of these and other color devices. In operation, processing device 4 facilitates color transformation of images from a source color device to destination color device.

Each of source and destination color devices 6 and 8 has a color gamut that defines the range of color that the device produces. In one example, the color gamuts of source and destination color devices 6 and 8 are different from each other. Consequently, in order to preserve similar color appearance when color is transferred from one device into another, for example from a monitor to a printer, the color gamut of each device is considered. The process of color matching, in which differences in color gamuts between the source device and the destination device are taken into consideration, is gamut mapping.

Figure 2:
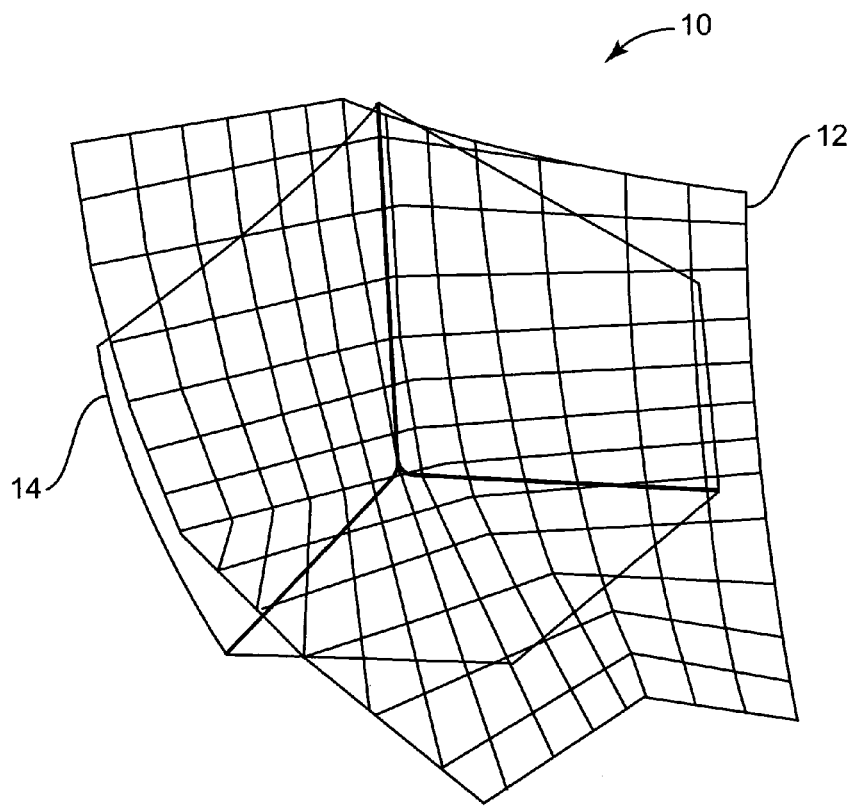
FIG. 2 illustrates a gamut comparison between sRGB and SWOP CMYK in three-dimensional CIE L*a*b* color space.

FIG. 2 is a three-dimensional representation of the color gamuts of source and destination color devices 6 and 8. In one example, CIE L*a*b* color space 10 illustrates a source color gamut 12 for and a destination color gamut 14. In one case, source color gamut 12 is for a color monitor and is represented in sRGB color space. In one case, destination color gamut 14 is for a digital color printer and is represented in SWOP CMYK color space. In one example, processing device 4 uses these different color gamuts 12 and 14 to transfer an image from the monitor to the printer.

Transforming colors from one device into another via gamut mapping is typically performed in a device-independent color space, such CIELAB, CIECAM02 JAB, or CIECAM97s JAB. FIG. 2 illustrates that the sRGB source gamut 12 is much larger than the SWOP destination gamut 14, but it does not encompass the entire SWOP gamut. Gamut mapping moves colors in the source device to fit into the destination device.

Traditional gamut mapping maps colors point by point using a three dimensional lookup table. For example, to generate a 17×17×17 three-dimensional lookup table for the transformation from sRGB to CMYK, each of 17×17×17 (or 4913) nodes goes through a gamut mapping in order to map each node from the sRGB gamut to the CMYK gamut. This process involves extensive computation that, in some applications, demands significant processing resources.

As is evident in FIG. 2, although color gamuts 12 and 14 share many points in common, many other color points that are producible in source color gamut 12 are not producible in destination color gamut 14 (for example, see the lower-right portion of color gamut 12 in FIG. 2). Similarly, many color points that are producible in destination color gamut 14 are not producible in source color gamut 12 (for example, see the lower-left portion of color gamut 14 in FIG. 2). To produce colors that are out of the destination gamut, gamut compression is performed. To use the portion of the destination gamut that is out of the source gamut, gamut expansion is performed. Without hue adjustments, some primary colors cannot be printed (in the case of a color printer destination device) with a reasonable lightness and chroma for a given destination printer. Thus, many gamut mapping methods perform gamut mapping in two steps: hue rotation followed by gamut mapping in constant hue angles.

Figure 3:
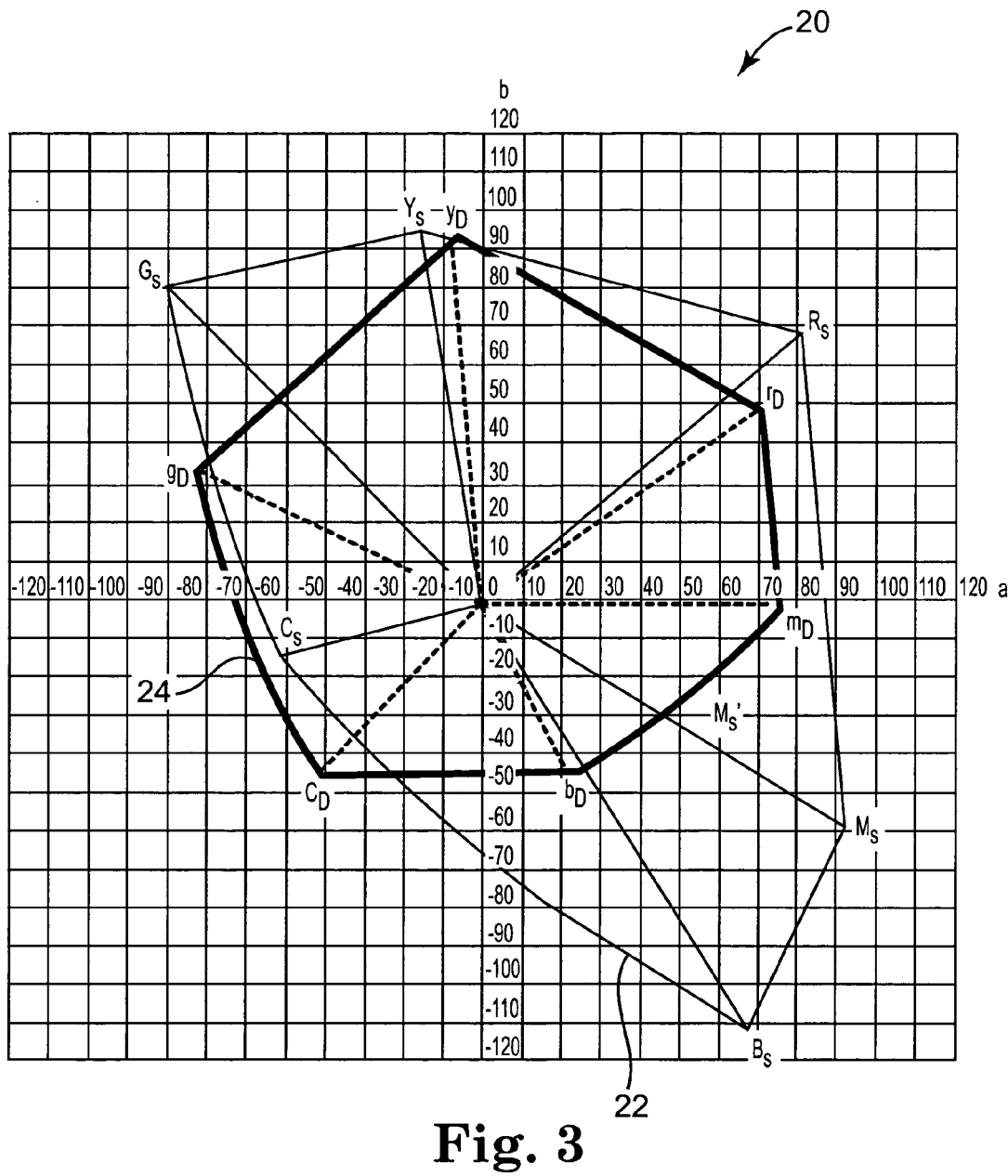
FIG. 3 illustrates a gamut comparison between sRGB and SWOP CMYK in two-dimensional CIE a*-b* color space.

FIG. 3 is a two-dimensional representation of a gamut comparison between sRGB and SWOP CMYK in CIE a*-b* color space. In other words, it is the illustration of FIG. 2 ignoring the L* coordinate. In one example, CIE a*b* color space 20 illustrates a planar slice 22 from the source color gamut 12 and a planar slice 24 from the destination color gamut 14. Planar slice 22 from the source color gamut 12 illustrates primary colors of the source: green ($G_S$), yellow ($Y_S$), red ($R_S$), magenta ($M_S$), blue ($B_S$), and cyan ($C_S$). Similarly, planar slice 24 from the destination color gamut 14 illustrates primary colors of the destination: green ($G_D$), yellow ($Y_D$), red ($R_D$), magenta ($M_D$), blue ($B_D$), and cyan ($C_D$).

In one example, if the sRGB magenta hue within the source color gamut 12 (represented by $M_s$ in FIG. 3) is not rotated towards the reddish direction, the capability of magenta within the destination color gamut 14 (represented by $M_s'$ in FIG. 3) will not be fully used. Thus, in FIG. 3, $M_s$ is mapped to $M_s'$. An sRGB reddish magenta that has lower chroma than that of the sRGB magenta can be mapped to a printed color that has higher chroma than that of the printed color corresponded to the sRGB magenta.

Hue rotation during primary mapping better preserves the relative color relationship among the gamut surface colors and high saturated colors. It is performed prior to the gamut mapping. In addition to hue adjustment, lightness adjustment is also applied to better preserve the relative color relationship among color gamuts, such as between source color gamut 12 and destination color gamut 14.

Figure 4:
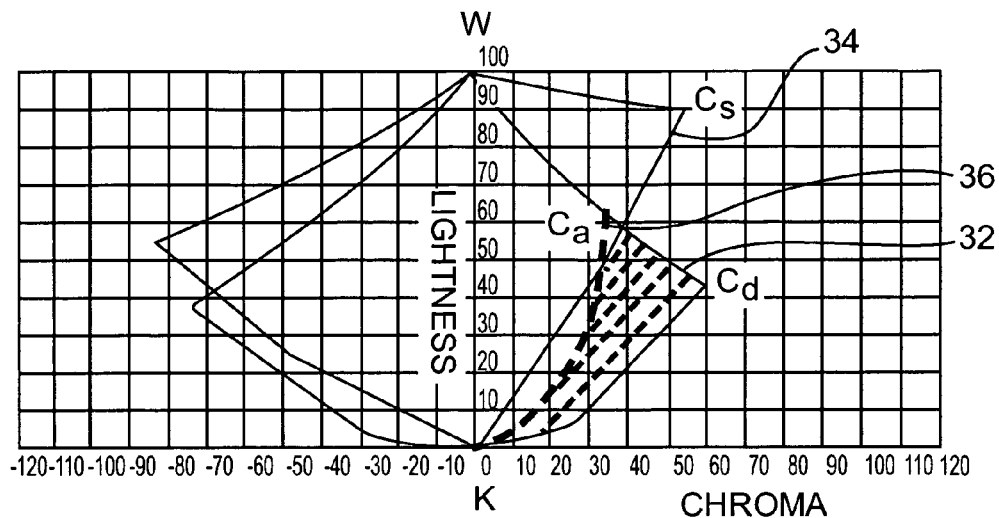
FIG. 4 illustrates a hue slice of a sRGB gamut and SWOP CMYK gamut from FIG. 2.

FIG. 4 illustrates a constant hue slice of sRGB gamut and SWOP CMYK gamut from FIG. 2. Lightness is in the vertical direction of the figure, and chroma in the horizontal direction. Constant hue slice 34 is from the source color gamut 12 and constant hue slice 32 is from the destination color gamut 14. The black point (K) is adjusted to zero, and white point (W) is illustrated above the black point (K). The lightness of the source cusp ($C_s$) can be reduced to map this point to the destination cusp ($C_d$) so that the source white-to-$C_s$ color ramp can be mapped to the destination white-to-$C_d$ color ramp and the source black-to-$C_s$ color ramp can be mapped to the destination black-to-$C_d$ color ramp nicely.

While this kind of mapping is typically appropriate for text and computer graphics, it typically induces too much distortion for images. An aimed point, such as $C_a$ in FIG. 4, can be chosen as a destination mapping primary for an image/photo rendering intent. Because the most saturated source point $C_s$ is mapped to $C_a$, the printable colors from $C_a$ to $C_d$ can not be used. The portion of the destination color gamut encompassed by curves or lines from the white point (W) to $C_a$ to the black point (K) to the white point (W) can be used as the aimed gamut. The portion of the destination gamut illustrated in dotted lines is not used with this mapping.

While the lightness adjustment can be performed during the gamut mapping, it can also be accomplished in a separated primary adjustment step prior to the gamut mapping, or be done by the joined operation of the primary adjustment and gamut mapping.

One embodiment of the present invention provides a "spring-primary" gamut mapping apparatus and method. Spring-primary gamut mapping combines primary adjustment and gamut mapping in a single step and well preserves the three-dimensional source gamut into a three-dimensional destination gamut in a three-dimensional manner such that is easy to visually maintain the color-to-color relative relationship. Furthermore, in one embodiment, gamut mapping is performed for only a small percentage of nodes in a lookup table, thus it takes significantly less time to generate a lookup table than methods that involve gamut mapping all the nodes of a lookup table. This basic concept for primary mapping and gamut adaptation is referred to as a spring-primary mapping process, and will be described in more detail below.

Figure 5A:
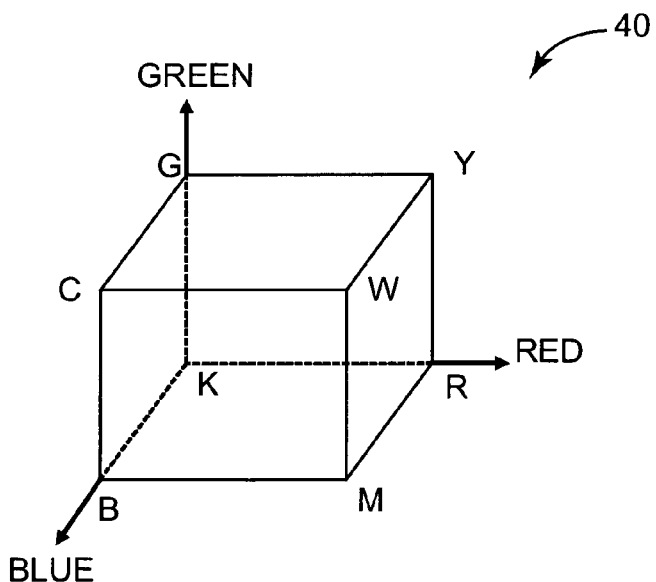
FIG. 5A illustrates a three-dimensional gamut represented in an RGB color space.

To visualize the gamut mapping in one embodiment of the invention, a three-dimensional gamut in a device RGB color space is transferred to a three-dimensional gamut in an L-S-H color space. FIG. 5A illustrates a three-dimensional gamut 40 of an RGB color space. Black (K) and white (W) nodes are illustrated, as are the primary colors blue (B), green (G), cyan (C), red (R), magenta (M), and yellow (Y). These nodes each comprise the eight corners of the illustrated rectangular three-dimensional source gamut 40. While more points are usually required to construct a gamut accurately, these eight points approximately represent a device gamut.

Figure 5B:
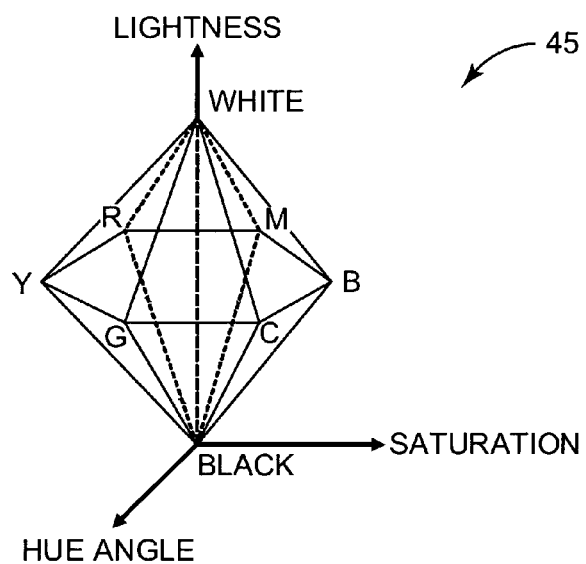
FIG. 5B illustrates a three-dimensional gamut represented in an L-S-H color space derived from the RGB color space of FIG. 5A.

FIG. 5B illustrates a three-dimensional gamut 45 in an L-S-H color space derived from the RGB color space of FIG. 5A. Again, black (K) and white (W) nodes are illustrated, as are the primary colors blue (B), green (G), cyan (C), red (R), magenta (M), and yellow (Y). Here, these nodes each comprise the eight corners of the illustrated three-dimensional gamut 45.

For a three-dimensional 17×17×17 sRGB lookup table, the indexes of each of the 4913 nodes are denoted as (r, g, b), where r, g, and b are integers from 0 to 16. In this way, the indexes of the eight corner nodes are:

K (black): (0, 0, 0);
B (blue): (0, 0, 16);
G (green): (0, 16, 0);
C (cyan): (0, 16, 16);
R (red): (16, 0, 0);
M (magenta): (16, 0, 16);
Y (yellow): (16, 16, 0); and
W (white): (16, 16, 16).

When the indexes of an sRGB color (r, g, b) are changed gradually from the black point (r=g=b=0) to the white point (r=g=b=16) with r=g=b, the color changes gradually from black to gray to white. If the color mapping of the white and black points of sRGB to the white and black of a destination device, such as a printer, in a device-independent color space are known, and the tone mapping curve is known, gamut mapping for each of these seventeen points is avoided.

When the indexes of an sRGB color (r, g, b) are changed from white (16, 16, 16) to red (16, 0, 0), that is, r=16, and g and b are changed gradually from g=b=16 to g=b=0, the color changes gradually in the red ramp from white (W) to the red primary (R). Again, since the transition relationship (or relative relationship) of these sRGB colors is known, gamut mapping for all seventeen points is avoided and only the two end points (the white point and the red primary) are performed. The remaining points can be computed and mapped using a more efficient method.

A similar approach can be applied to other group of colors, such as the color ramps of W-to-G, W-to-B, W-to-Y, W-to-M, W-to-Y, K-to-R, K-to-G, K-to-B, K-to-C, K-to-M, and K-to-Y.

In one embodiment of the invention, a lookup table for the transformation from a source color space to a destination color space, which is based on the relative color relationship of neighbor nodes, is generated by gamut mapping for only a small portion of points. This method provides a more efficient approach to map other points from the source gamut to the destination gamut than gamut mapping each of the points from one color device gamut to another.

The spring-primary mapping process for primary mapping and gamut adaptation will be described in more detail below with exemplary embodiments. For the exemplary embodiments described below, gamut mapping will be denoted in the LAB color space, although one skilled in the art will understand that gamut mapping is also performed in other lightness-chrominance color space, such as CIELAB, CIELUV, CIECAM97s Jab, or CIECAM02 Jab color space.

In one embodiment, the first step in the spring-primary mapping process is to perform white point and black point adaptation. For perceptual preference mapping, the source white point (W) is mapped to the destination white point (w), and the source black point (K) is mapped to the destination black point (k). A white point adaptation method (such as Von Kries transformation or other advanced color appearance modeling) is applied for the white point adaptation. A black point adjustment method is applied to map the source black point to the destination black point. The white point and black point adaptation are performed for all colors.

White point and black point adaptation can be performed in CIE XYZ space, a color corrected RGB color space, or in other color space. In addition, a tone mapping or contrast mapping method can be applied for tone adjustment. Other preference adjustments can also be applied. During the white point and black point adjustment, all colors are adjusted accordingly.

In one embodiment, the next step in the spring-primary mapping process, after the white point and black point adaptation is performed, is to process neutral points, that is, the points along the line between the white point and black points (the vertical line in FIG. 5B). The source color space values of each neutral node in a lookup table (for example, nodes for R=G=B in an sRGB lookup table) are converted to LAB. The destination LAB are computed by one-dimensional interpolation instead of by gamut mapping. For example, in one embodiment, the following linear interpolation equations are applied to compute output color values:

$$L_{ia} = L_{ka} + \left(\frac{L_{wa} - L_{ka}}{L_{ws} - L_{ks}}\right) \cdot (L_{is} - L_{ks})$$

$$A_{ia} = A_{ka} + \left(\frac{A_{wa} - A_{ka}}{A_{ws} - A_{ks}}\right) \cdot (A_{is} - A_{ks})$$

$$B_{ia} = B_{ka} + \left(\frac{B_{wa} - B_{ka}}{B_{ws} - B_{ks}}\right) \cdot (B_{is} - B_{ks})$$

In the above linear interpolation equations, $(L_{is}, A_{is}, B_{is})$ and $(L_{ia}, A_{ia}, B_{ia})$ are the LAB values of a source color and its corresponding aimed output mapped color;

$(L_{ws}, A_{ws}, B_{ws})$ and $(L_{wa}, A_{wa}, B_{wa})$ are LAB values of the source white point and the destination white point (they are actually the same with a complete white point adaptation); and $(L_{ks}, A_{ks}, B_{ks})$ and $(L_{ka}, A_{ka}, B_{ka})$ are LAB values of the source black point and the destination black point (they are the same after the black point adjustment).

If the chrominance of the neutral axis is zero (i.e. A=B=0 for color in the neutral axis), $A_{ia}$ and $B_{ia}$ are not computed by above equations. Instead, A and B are simple assigned with zero.

In an alternative embodiment, a distance based interpolation, described by the distance equations below, is used instead:

$$r_w = \frac{1}{D_{iw}}$$

$$r_k = \frac{1}{D_{ik}}$$

$$L_{ia} = \frac{L_{wa} \cdot r_w + L_{ka} \cdot r_k}{r_w + r_k}$$

$$A_{ia} = \frac{A_{wa} \cdot r_w + A_{ka} \cdot r_k}{r_w + r_k}$$

$$B_{ia} = \frac{B_{wa} \cdot r_w + B_{ka} \cdot r_k}{r_w + r_k},$$

where $D_{iw}$ is the distance or color difference between a neutral point and the white point in the source color space, and $D_{ik}$ is the distance or color difference between a neutral point and the black point in the source color space.

The output LAB values are computed, they are converted to output device color space values by 3-D interpolation (such as inverse tetrahedral interpolation).

For a 17×17×17 three-dimensional RGB lookup table, the indexes of the neutral nodes from W (the white point) to K (the black point) are: (16, 16, 16), (15, 15, 15), (14, 14, 14), (13, 13, 13), (12, 12, 12), (11, 11, 11), (10, 10, 10), (9, 9, 9), (8, 8, 8), (7, 7, 7), (6, 6, 6), (5, 5, 5), (4, 4, 4), (3, 3, 3), (2, 2, 2), (1, 1, 1), and (0, 0, 0).

In one embodiment, the next step in the spring-primary mapping process, after processing neutral points, is determining aimed primaries of the gamut surface. Aimed primaries are determined before primary mapping. The lightness and hue angle of each aimed primary are determined by following weighting equations:

$$L_{aimed} = w_L \cdot L_{source} + (1 - w_L) \cdot L_{destination}$$

$$h_{aimed} = w_h \cdot h_{source} + (1 - w_h) \cdot h_{destination}$$

where $L_{aimed}$, $L_{source}$, and $L_{destination}$ are the aimed lightness, the source lightness, and the destination lightness of a primary, respectively; where $h_{aimed}$, $h_{source}$, and $h_{destination}$ are the aimed hue angle, the source hue angle, and the destination hue angle of the same primary, respectively; where $w_L$ and $w_h$ are a weighting parameter for lightness and hue angle, respectively. In one embodiment, the $w_L$ and $w_h$ values are between 0 and 1.

Figure 6:
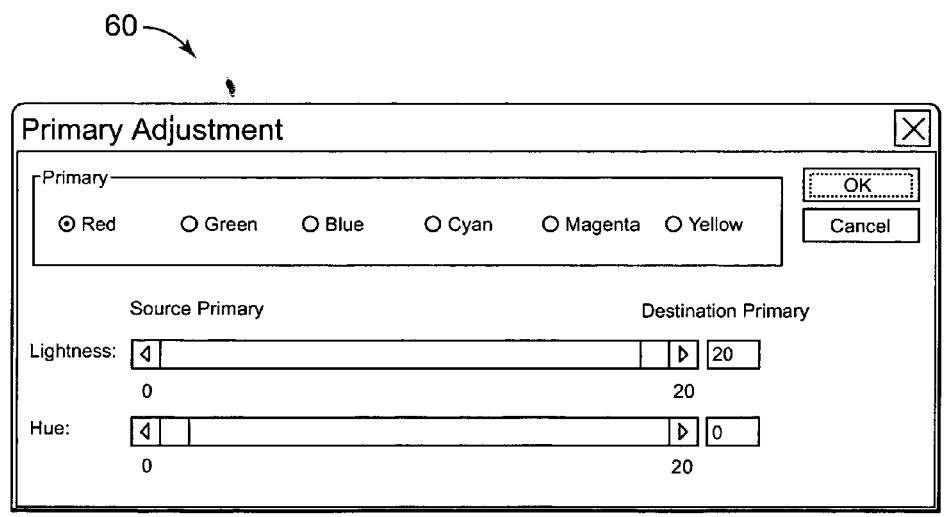
FIG. 6 illustrates a user interface used in one embodiment to adjust weighting parameters.

The weighting parameters for lightness and hue angle $w_L$ and $w_h$ can be adjusted in order to optimize the destination primaries. In one embodiment, user interface 60, illustrated in FIG. 6, is provided to adjust weighting parameters. Via user interface 60, weighting parameters for each aimed primaries (Red, Green, Blue, Cyan, Magenta, and Yellow) can be adjusted by first clicking an appropriate primary color (Red is illustrated as selected in the example in FIG. 6) and then sliding one slider associated with lightness and one slider associated with hue. In the illustrated example, the slider position 0 corresponds to a weight of 1.0 (using the source primary as the aimed primary for the lightness or the hue angle), and the slider position 20 corresponds to a weight of 0 (using the destination primary as the aimed primary for the lightness or the hue angle). In this way, a determination is made for each of the primaries.

The aimed lightness ($L_{aimed}$) and the aim hue angle ($h_{aimed}$) or the weights $w_L$ and $w_h$ can be determined by algorithms automatically. For example, they can be determined based on rendering intents (e.g. different aims are determined between photographic mapping and graphic mapping). For a graphic rendering intent, the source primaries can be mapped exactly to the destination primaries, respectively. Image and photo mapping usually allows less hue, lightness, and chroma adjustments.

Figure 7:
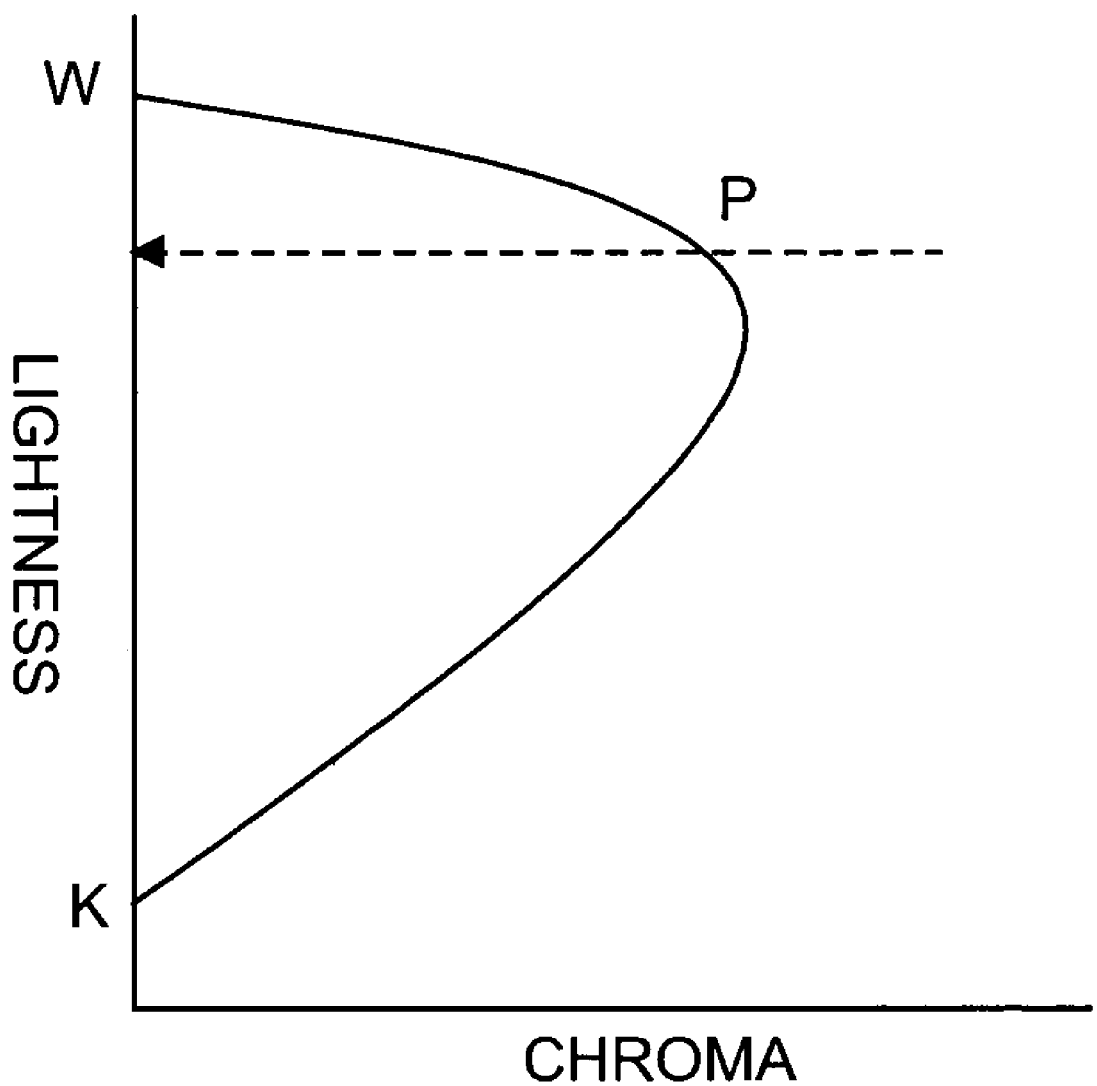
FIG. 7 illustrates a constant hue gamut slice plotting lightness against chroma.

After lightness ($L_{aimed}$) and hue angle ($h_{aimed}$) of an aimed primary are determined, the chroma of the aimed primary is computed by finding the maximum chroma value of a color with lightness=$L_{aimed}$ and hue angle=$h_{aimed}$ in the destination gamut, i.e. the aimed primary is the point in the destination gamut surface that has lightness=$L_{aimed}$ and hue angle=$h_{aimed}$. This can be done by gamut mapping in the constant hue angle=$h_{aimed}$ and constant lightness=$L_{aimed}$ as illustrated in FIG. 7. FIG. 7 illustrates a constant hue gamut slice, with lightness in the vertical direction and chroma in the horizontal direction. K is the adapted black point, and W is the adapted white point. In this $h_{aimed}$ hue angle, the gamut mapping search the maximum chroma in a constant lightness $L_{aimed}$ as shown on the dashed line. The maximized chroma point P is located as the aimed primary.

The chrominance A and B of LAB color gamut can be converted from LCh by:

$$A = C \cdot \cos(h)$$

$$B = C \cdot \sin(h)$$

where C is chroma and h is hue angle.

This process is then repeated for each primary, such that all six aimed primaries are determined using gamut mapping.

If the weighting parameter for both lightness and hue angle for a primary are 0, the aimed primary is the destination primary, and no gamut mapping is required to search the aimed primary point P.

In one embodiment, the next step in the spring-primary mapping process, after the aimed primaries are determined, is performing geometrical gamut reshaping in order to map the source gamut to the aimed gamut. Where the weighting parameter for lightness and hue angle corresponds to 0, then the aimed gamut is also the destination gamut.

Related U.S. patent application Ser. No. 11/118,038 entitled FAST COLOR MAPPING USING PRIMARY ADJUSTMENT WITH GAMUT ADAPTATION, incorporated by reference herein, discloses a method to map a source gamut to an aimed gamut using a general geometrical reshaping method. This method can be used to generate the mapping of the gamut surface points of a three-dimensional lookup table.

In an alternative embodiment, rather than using this general geometrical reshaping method, a process for mapping gamut surface points can be used instead. This method provides more controls for color adjustments.

Figure 8:
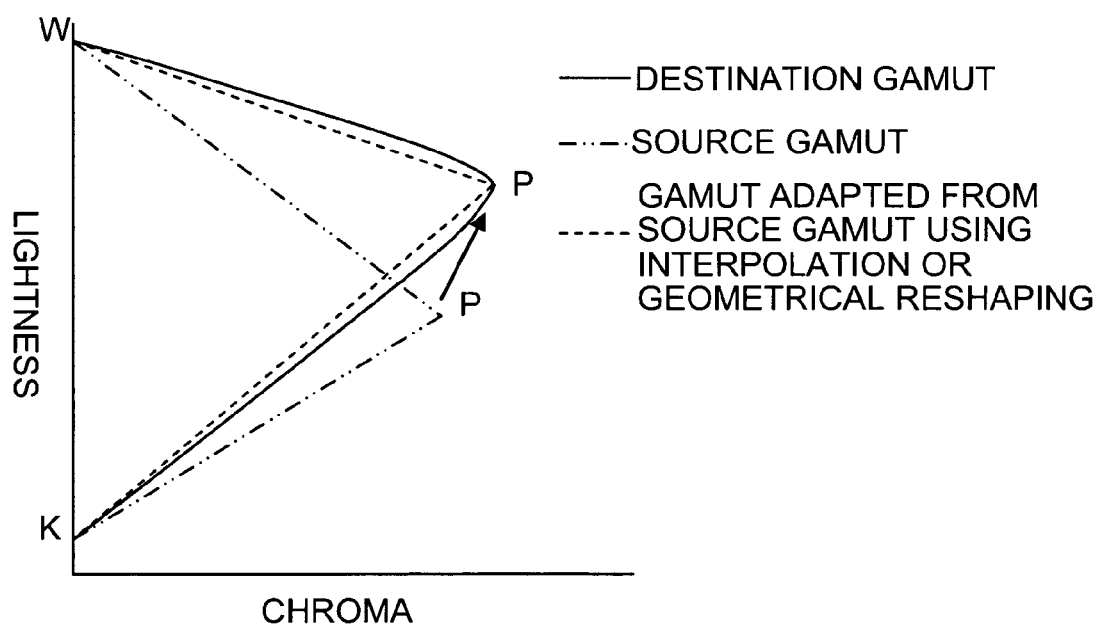
FIG. 8 illustrates gamut adaptation using only the corner points.

To keep the primary mapping simple, eight gamut corner points are used to reshape a 3-D source gamut into a destination gamut with an aimed primary set. However, eight corner points are not able to trace the shape between end points. FIG. 8 illustrates a source primary hue slice WPK is mapped to a destination primary hue slice WpK. In this example, the source primary P is mapped to the destination primary p.

After the primary adjustment using a geometrical reshaping method or a linear interpolation method, the adjusted gamut is not exactly adapted to the destination gamut (for example, a ramp from the white point W to the primary P from the adjusted gamut is not exactly overlapped with the corresponding ramp from the destination gamut). If a primary set is fuzzy (e.g. a photo image set does not have clear primaries), this can still be acceptable. However, matching primary ramps can be a challenge in many situations, such as in order to map sRGB yellow primary ramp to a printer yellow primary ramp for inkjet printing. An examination of the mapping in a three dimensional space, the challenge is not only on lines, but on the entire gamut surface as well. In order to achieve accurate primary mapping and to map the source gamut surface to the destination surface in primary mapping, colors are fine tuned after primary mapping. In the description below, hue angles are adjusted using the information of source hue angle, a hue adjustment LUT, and source lightness. Gamut mapping can be employed to guarantee a source gamut surface point is mapped to the gamut surface of the destination gamut. These processes improve the accuracy of gamut adaptation by primary mapping using only eight corner points.

In one case, mapping gamut surface points has two steps: mapping important lines (lines from the white point to each of the six primaries, lines from the black to each of the six primaries, and lines to connect two neighbor primaries), and mapping points on gamut surface triangles. The mapping of nodes on important lines can be divided into three steps: mapping nodes on lines to connect the white point and each of the six primaries, mapping nodes on lines to connect the black point and each of the six primaries, and mapping nodes on lines to connect two neighbor primaries.

A hue adjustment one-dimensional lookup table is generated and is used to process some or all of the above steps.

By converting LAB values of the source and aimed primaries into LCh, the amount of hue rotation for each primary can be computed. As six source primaries are snapped to their corresponding aimed primaries, a hue angle adjustment lookup table is generated based on the hue rotation of the six primaries. For each of the six source primary hue angles, the hue adjustment is the aimed hue angle minus the source hue angle at this primary. For all other hue angle, hue adjustment amount is computed by linear or nonlinear interpolation.

Figure 9A:
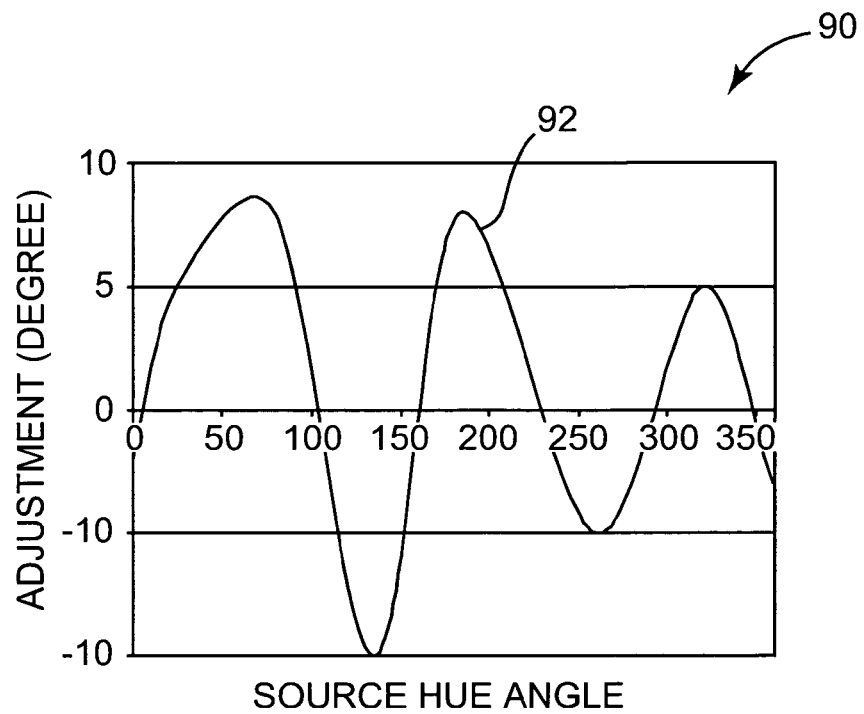
FIG. 9A illustrates a one-dimensional lookup table for hue adjustment.

FIG. 9A illustrates an example of a one-dimensional lookup table to adjust the hue angle. This lookup table is used to convert source hue angles into aimed hue angles for the primary mapping (preference hue mapping and manual hue adjustment can also be included). The aimed hue angle equals to the source hue angle plus the hue adjustment amount obtained from the one-dimensional hue adjustment lookup table.

In one embodiment, several restrictions can be applied to limit the hue adjustment. If the amount of hue difference in a primary is too large, the adjustment can be reduced. For example, if the maximum hue adjustment for the Red primary is set to 30-degrees, and the difference of the source Red hue angle and the aimed Red hue angle is 35-degrees, the adjustment of the Red primary is adjusted down to 30-degrees. Other restrictions can also be included to reduce the hue adjustment in some sensitive color regions.

Figure 9B:
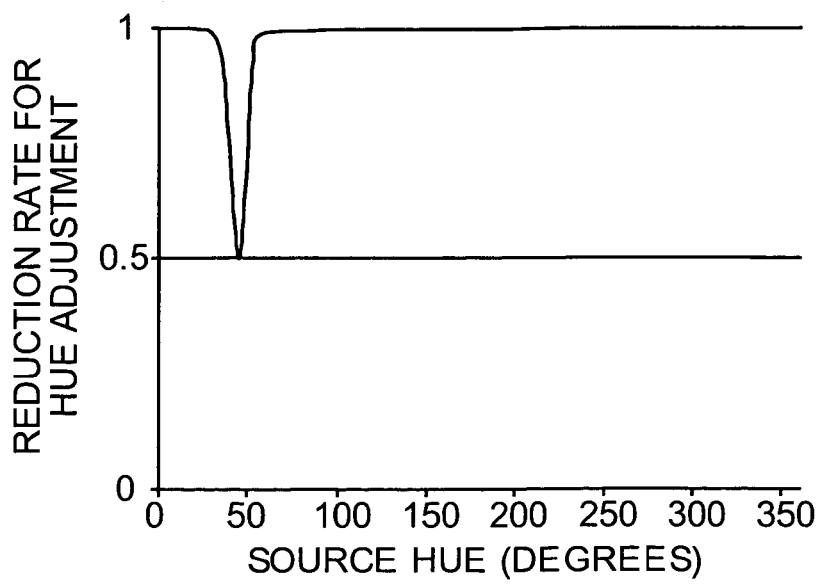
FIG. 9B illustrates a scale to reduce hue adjustment in the skin tone region.

Extra restriction can be applied to the hue adjustment for skin tone colors. The hue angle of the skin tone is computed, and then reduction rates are applied to the above hue adjustment LUT to reduce the hue adjustment for the skin tone region. FIG. 9B illustrates an example of hue adjustment reduction for skin tone. In this example, the hue center of the skin tone is 45-degrees in the LAB color space, the hue range of the skin tone is between (45-Δ) and (45+Δ) degrees (Δ is a small hue angle), and the hue adjustment is reduced by 50% for the center skin tone (a reduction scale of 1 means no reduction). This hue reduction curve is concatenated with the hue adjustment curve in FIG. 9A (that is, the final adjustment is the multiplication of the two curves, point-by-point). The hue adjustment is set properly to avoid non-smooth transition.

In one embodiment, there are six lines in the gamut boundary that connect the white point and a primary point and six lines that connect the black point and a primary point (see, for example FIG. 5B). In a 17×17×17 3-D LUT, the nodes of these lines are:

White to Cyan: (16, 16, 16), (15, 16, 16), (14, 16, 16), ..., (0, 16, 16);

White to Magenta: (16, 16, 16), (16, 15, 16), (16, 14, 16), ..., (16, 0, 16);

White to Yellow: (16, 16, 16), (16, 16, 15), (16, 16, 14), ..., (16, 16, 0);

White to Red: (16, 16, 16), (16, 15, 15), (16, 14, 14), ..., (16, 0, 0);

White to Green: (16, 16, 16), (15, 16, 15), (14, 16, 14), ..., (0, 16, 0);

White to Blue: (16, 16, 16), (15, 15, 16), (14, 14, 16), ..., (0, 0, 16);

Cyan to Black: (0, 16, 16), (0, 15, 15), (0, 14, 14), ..., (0, 0, 0);

Magenta to Black: (16, 0, 16), (15, 0, 15), (14, 0, 14), ..., (0, 0, 0);

Yellow to Black: (16, 16, 0), (15, 15, 0), (14, 14, 0), ..., (0, 0, 0);

Red to Black: (16, 0, 0), (15, 0, 0), (14, 0, 0), ..., (0, 0, 0);

Green to Black: (0, 16, 0), (0, 15, 0), (0, 14, 0), ..., (0, 0, 0); and

Blue to Black: (0, 0, 16), (0, 0, 15), (0, 0, 14), ..., (0, 0, 0).

For each line, the LAB mappings from the source gamut to the destination gamut of two end nodes in each line have been obtained in the step of calculating the aimed primaries, as described above. The LAB mapping from the source gamut to the destination gamut for intermediate nodes is not directly obtained through gamut mapping. In one embodiment, a distance-based interpolation method is used, and in another a one-dimensional interpolation method, described above with respect to processing neutral points, is applied to compute the output LAB values of intermediate nodes.

As described before, primary mapping using interpolation or geometrical reshaping might not rotate the gamut accurately (for example, see FIG. 8). After the interpolation for each node in a line, a gamut mapping can be applied to fine-tune each point so that each point is stay on the gamut surface of the destination gamut or inside the destination gamut.

In one embodiment, an alternative method is applied to process these two groups of lines (white to each primary and black to each primary). The hue adjustment one-dimensional lookup table is generated prior to processing these two groups of lines.

To process each node between the white point and a primary, the source RGB values of each node are converted to LAB (including the white and the black point adjustments and tone adjustment), and then to LCh.

The hue (h) adjustment lookup table is applied to adjust the hue angle, that is, the output hue angle equals the source hue angle plus the hue adjustment amount of the current hue angle obtained from the one-dimensional hue adjustment lookup table. The lightness (L) adjustment is performed by one-dimensional interpolation. In LAB space, the L value to adjust a primary is noted ΔL, $$\Delta L = L_{p\_aimed} - L_{p\_source},$$

where $L_{p\_aimed}$ is the aimed lightness value of the primary, and $L_{p\_source}$ is the lightness value of the source primary.

The output L component is computed by $$L_{out} = L_{source} + \Delta L \frac{L_W - L_{source}}{L_W - L_{p\_source}},$$

where $L_{source}$ is the source L of a point on the line between the white point and the primary point, and $L_W$ is the L value of the source white point which is actually equals to the L value of the destination white point.

Chroma (C) is also adjusted accordingly. The chroma of the source primary ($C_S$) and the chroma of the destination primary ($C_D$) are computed using the source LAB and the destination LAB, respectively. A chroma adjustment ratio is computed by $$r = C_D / C_S.$$

The aimed chroma of each point on the primary ramp is the source chroma multiplied by this ratio. A gamut mapping method can be applied to move the color to the gamut surface of the destination device gamut. Or, the output chroma can be directly obtained by preserving hue and preserving lightness gamut mapping.

After the h, L, and C adjustment, the LCh values can be converted back to LAB. By interpolation using the destination interpolation function, the LAB values of this point are converted to the output device color values.

If the aimed primary is exactly a destination primary, the output device color values should be adjusted to ensure that a pure source primary color ramp is mapped to a pure output primary color ramp. The final output device color values are used to compute corresponding LAB values that will be used in steps to process nodes on the gamut surface triangles and interior nodes.

The process to map nodes between a primary and the black point is similar to the process to perform the mapping for nodes between the white point and a primary. For each node on a line between the black point and a primary, its source device color values are converted to LAB (including the white and the black point adjustments and tone adjustment), and then to LCh.

Figure 10:
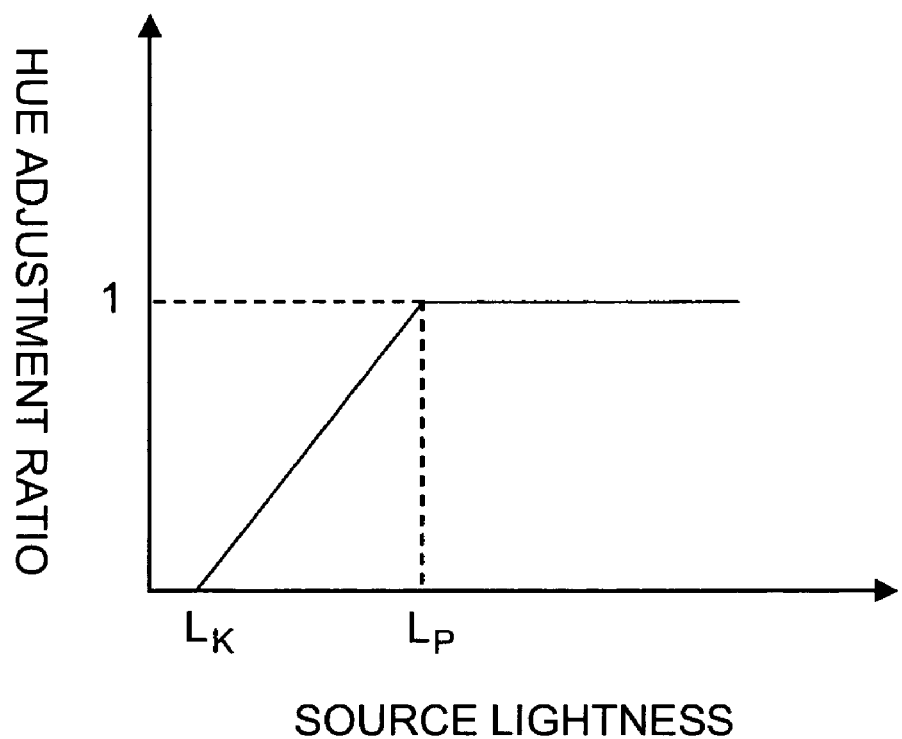
FIG. 10 illustrates hue adjustment ratio for points on a line between a primary and the black point.

The hue angle (h) is rotated using the hue adjustment one-dimensional lookup table. In order to reduce the hue adjustment gradually as a color is moved away from the primary, a hue adjustment ratio is computed and multiplied with the hue adjustment for reducing the hue rotation amount. FIG. 10 illustrates an example of determining the hue adjustment ratio. The horizontal axis is the source lightness and the vertical axis is the hue adjustment ratio. $L_P$ and $L_K$ are the lightness of the source primary and the adapted black point, respectively. For a primary node, the reduction scale is set to 1; for the black point, the reduction scale is set to zero; for the nodes between these two points, a smooth transition scale can be obtained by linear or nonlinear interpolation. The hue adjustment amount is multiplied by this reduction scale.

After the hue (h) adjustment, lightness (L) adjustment is followed. In LAB space, the L value to adjust a primary is noted $\Delta L$, $$\Delta L = L_{p\_aimed} - L_{p\_source},$$

where $L_{p\_aimed}$ is the aimed lightness value of the primary, and $L_{p\_source}$ is the lightness value of the source primary.

Lightness component is adjusted by $$L_{out} = L_{source} + \Delta L \frac{L_K - L_{source}}{L_K - L_{P\_source}},$$

where $L_{source}$ is the source lightness of a point on the line between the white point and the primary point, and $L_K$ is the lightness value of the source black point which is actually equals to the lightness value of the destination black point due to the black point adaptation.

Chroma (C) is also adjusted accordingly. The chroma of the source primary ($C_S$) and the chroma of the destination primary ($C_D$) are computed using the source LAB and the destination LAB, respectively. A chroma adjustment ratio is computed by $$r = C_D / C_S.$$

The output chroma of a node on the line between a primary and the black point equals to the source chroma of the point multiplied by this scale.

The LCh values are then converted back to LAB. A gamut mapping method can be applied to ensure the output color is within the destination gamut or to move the color exactly on the destination gamut surface. The output colors are finally converted to the output color space values by 3-D interpolation.

Figure 11:
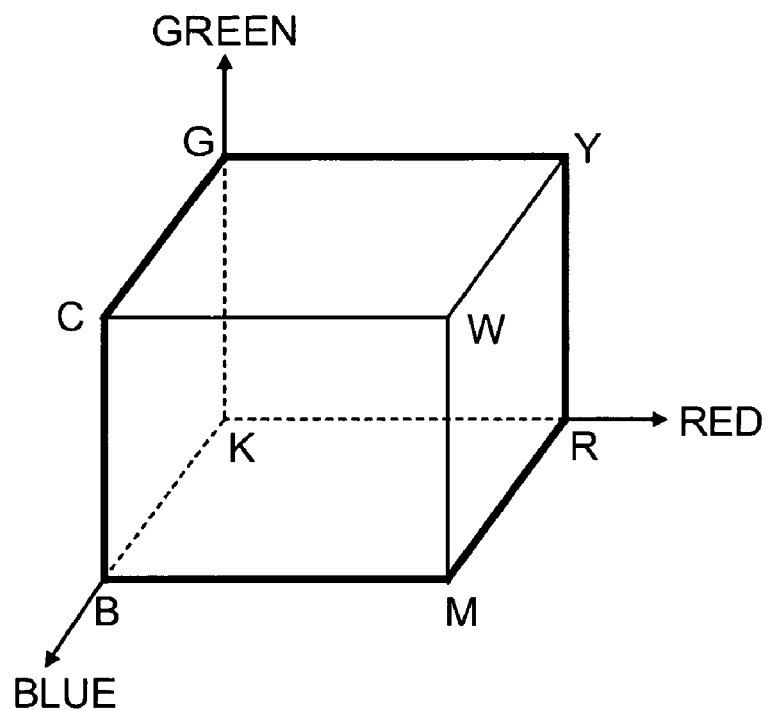
FIG. 11 illustrates thick lines (the lines connected two neighbor primaries) on which edge points located.

The hue adjustment 1-D LUT is also applied to rotate hue angle for the edge points (or cusp points). These edge points are the points on the lines connected two neighbor primaries (R-Y, Y-G, G-C, C-B, B-M, and M-R). These nodes are located on the cusp of the L-S-H space shown in FIG. 5B, or are located on the thick lines of the RGB space illustrated in FIG. 11. In one embodiment, there are six lines to process in this step (see, for example FIG. 5B). The nodes of these six lines in a 17×17×17 lookup table are:

1. Red to Yellow: (16, 0, 0), (16, 1, 0), (16, 2, 0), . . . , (16, 16, 0);
2. Yellow to Green: (16, 16, 0), (15, 16, 0), (14, 16, 0), . . . , (0, 16, 0);
3. Green to Cyan: (0, 16, 0), (0, 16, 1), (0, 16, 2), . . . , (0, 16, 16);
4. Cyan to Blue: (0, 16, 16), (0, 15, 16), (0, 14, 16), . . . , (0, 0, 16);
5. Blue to Magenta: (0, 0, 16), (1, 0, 16), (2, 0, 16), . . . , (16, 0, 16); and
6. Magenta to Red: (16, 0, 16), (16, 0, 15), (16, 0, 14), (16, 0, 0).

For each node on a line between two neighbor primaries, its source device color values are converted to LAB, and then to LCh. To perform the mapping for each node on these six lines, the lightness is computed using an interpolation method. For example, the one-dimensional interpolation described above for determining neutral points is used in one embodiment, and other linear or nonlinear 1-D interpolation methods can also be applied. The output hue angle is obtained by applying the hue adjustment lookup table to the source hue angle. After the lightness and the hue angle are computed, the output chroma (or chrominance A and B) is obtained by gamut mapping. A gamut mapping method preserving hue and preserving lightness (for example, illustrated in FIG. 7) can be applied. The mapping point in the gamut surface is the output mapping point. Other gamut mapping methods, such as minimum-distance mapping, can also be applied. For less optimized color mapping, the output chroma can be obtained by one-dimensional interpolation using chroma of two end primary points.

Figure 12:
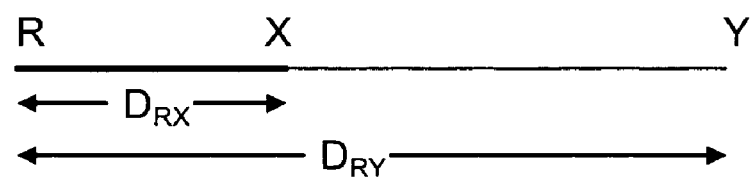
FIG. 12 illustrates a distance-based interpolation on a line.

In an alternative embodiment, a slightly different method, as described below, is applied in this step. FIG. 12 illustrates how to compute aimed lightness (L) and chroma (C) using a weighting parameter. R (red) and Y (yellow) primaries are used in this example. Point X is a node on a line between two primaries, R and Y. The distance of XR and RY are computed using the source LAB color values by following equations:

$$D_{RY} = \sqrt{(L_R - L_Y)^2 + (A_R - A_Y)^2 + (B_R - B_Y)^2}$$

$$D_{RX} = \sqrt{(L_R - L_X)^2 + (A_R - A_X)^2 + (B_R - B_X)^2}$$

Then a weight w is computed by $$w = D_{RX} / D_{RY}.$$

The output LAB (aimed LAB) of a node on the RY line is computed by the weighting combination of aimed LAB colors of R and Y as show below:

$$L = L_R \cdot (1-w) + L_Y \cdot w$$

$$A = A_R \cdot (1-w) + A_Y \cdot w$$

$$B = B_R \cdot (1-w) + B_Y \cdot w$$

The aimed chroma is computed using above A and B:

$$C=\sqrt{A^2+B^2}$$

The final A and B are computed:

$$A=C\cdot\cos(h)$$

$$B=C\cdot\sin(h)$$

where h is the output hue angle computed earlier in this section using the source hue angle and the 1-D hue adjustment LUT.

Above output LAB can be slightly adjusted by gamut mapping so that they are located on the gamut surface of the destination gamut. They are then converted to the output device colors by a 3-D inverse interpolation.

In the final step of this mapping gamut surface points process, the remaining gamut surface points are mapped. FIG. 5B illustrates that a gamut boundary can be constructed by twelve triangles (six of them are constructed by the white point and two neighboring primaries and the other six are constructed by the black point and two neighboring primaries). Node points on the gamut surface are processed by interpolating in each triangle. The LAB values of a node can be computed by linear or nonlinear interpolation using a few closest points.

Figure 13:
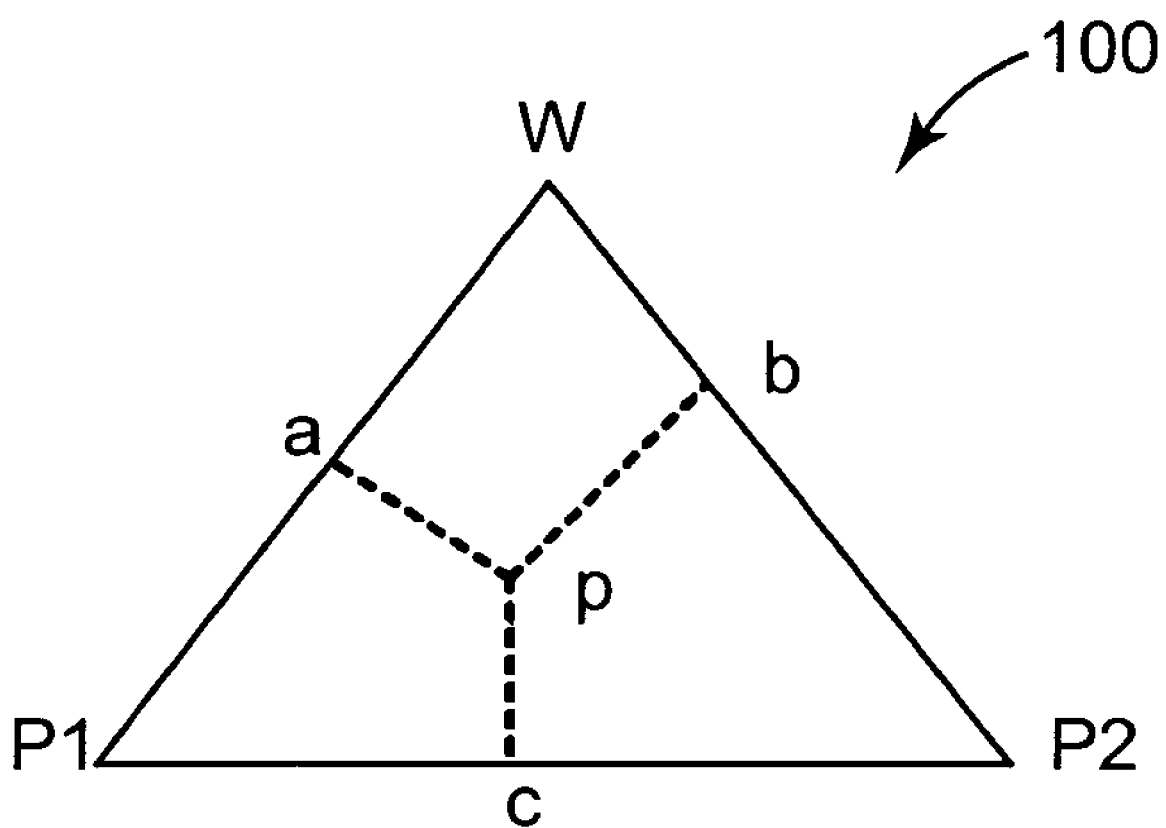
FIG. 13 illustrates a distance-based interpolation on a triangle.

FIG. 13 illustrates a distance-based interpolation on a triangle. At this step, the mapping of every node on three lines of a gamut surface triangle has been done. For any point inside the triangle, three closest nodes from three directions are found for interpolation. The interpolation can be performed by following equations:

$$r_a = 1/D_{ap}$$

$$r_b = 1/D_{bp}$$

$$r_c = 1/D_{cp}$$

$$L_p = \frac{L_a \cdot r_a + L_b \cdot r_b + L_c \cdot r_c}{r_a + r_b + r_c}$$

$$A_p = \frac{A_a \cdot r_a + A_b \cdot r_b + A_c \cdot r_c}{r_a + r_b + r_c}$$

$$B_p = \frac{B_a \cdot r_a + B_b \cdot r_b + B_c \cdot r_c}{r_a + r_b + r_c}$$

In above, $D_{ap}$, $D_{bp}$, and $D_{cp}$ are the distances or color differences of p-a, p-b, and p-c, respectively; and $(L_p, A_p, B_p)$, $(L_a, A_a, B_a)$, $(L_b, A_b, B_b)$, and $(L_c, A_c, B_c)$ are the LAB values of the points, p, a, b, and c, respectively.

In an alternative embodiment, more than three points are used for the interpolation, and in still other cases, other interpolation methods are used for the interpolation.

By applying triangle interpolations to all triangles in the source gamut surface, all gamut surface nodes in a three-dimensional lookup table are processed by interpolation except for a few nodes on the primary lines or edge lines.

For finer optimization, a gamut mapping method (e.g. minimum-distance mapping) can be applied to ensure the output colors are within the destination gamut or to move the output colors to the destination gamut surface.

In one embodiment, the next step in the spring-primary mapping process, after the surface points are mapped (whether by the general geometrical reshaping method, or by the process for mapping gamut surface points), is processing the interior points, that is, those nodes on the interior of the source gamut surface. The related U.S. patent application Ser. No. 11/118,038 entitled FAST COLOR MAPPING USING PRIMARY ADJUSTMENT WITH GAMUT ADAPTATION, discloses a method to process interior points.

For each point that has been mapped from the source LAB to the destination LAB, an interpolation method (for example, tetrahedral interpolation) is applied to map the LAB into the destination device color space.

In this way, the spring-primary mapping process avoids gamut mapping each node from a source color gamut to a destination color gamut, thereby providing a faster method of transformation of colors from a source gamut to a destination gamut.

Figure 14:
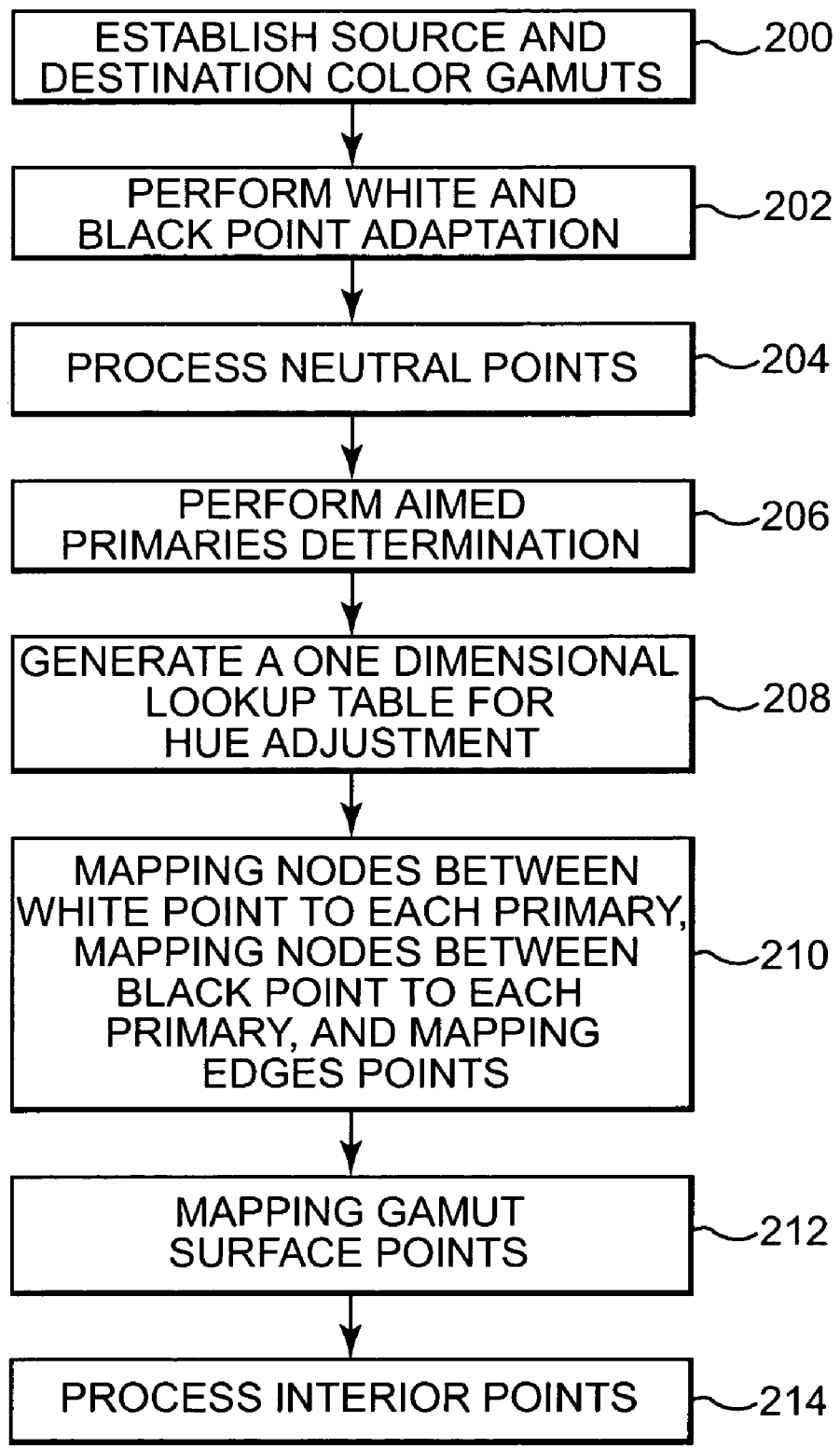
FIG. 14 is a flow chart illustrating one embodiment of a spring-primary mapping process in accordance with the present invention

FIG. 14 is a flow chart illustrating one embodiment of constructing a three-dimensional lookup table from a source color device to a destination color device using the spring-primary mapping process in accordance with the present invention.

At step 200, color gamuts are established for a source device and for a destination device. A device-independent color space (denoted LAB) is used for gamut representation and gamut mapping. This LAB color space can be CIELAB, CIELuv, CIECAM97s JAB, CIECAM02 JAB, etc. In one embodiment, the source device is a color monitor and the source color gamut is established by converting the RGB color space into LAB. In one embodiment, the destination device is a color printer and the destination color gamut is established in LAB converted from the CMYK color space.

At step 202, white point and black point adaptation is performed. For perceptual preference mapping, the source white point (W) is mapped to the destination white point (w), and the source black point (K) is mapped to the destination black point (k) in this step. The tone appearance adjustment and or color preference adjustment can be performed.

At step 204, neutral points of the color gamuts are processed. In this step, all the points along the line between the white point and black points are processed from the source to the destination gamut. In one case, linear interpolation equations are applied to compute output color values, and in another case a distance based interpolation is used.

Next, at step 206 the aimed primaries of the gamut surface are processed. In one embodiment, aimed or destination primaries are determined before the primary mapping. In one case, the lightness and hue angle of each aimed primary are determined using weighting equations. In another case, the lightness and hue angle of each aimed primary are determined by rendering intent based modeling. After lightness and hue angle of each of the primaries are determined, the chroma of the aimed primary is computed in one case by gamut mapping in a constant hue angle and constant lightness. This process is used for each primary, such that all six aimed primaries are determined using gamut mapping.

Next, at step 208 a one-dimensional lookup table is constructed for hue rotation. By converting LAB values of the source and aimed primaries into LCh, the amount of hue rotation for each primary can be computed. As six source primaries are snapped to their corresponding aimed primaries, a hue angle adjustment lookup table is generated based on the hue rotation of the six primaries. For each of the six source primary hue angles, the hue adjustment is the aimed hue angle minus the source hue angle at this primary. For all other hue angle, an interpolation is perform to obtain hue adjustment amount. This lookup table is used to convert source hue angles into aimed hue angles for the primary mapping (preference hue mapping and manual hue adjustment can also be included).

At step 210, the nodes between the white point and each of the six primaries, the nodes between the black point and each of the six primaries, and the nodes between two neighbor primaries are mapped. No specific processing order is required to process these three group of nodes.

At step 212, the gamut surface points are mapped. In one embodiment, twelve triangles are designated, and node points on the gamut surface are processed by interpolating in each triangle. The LAB values of a node can be computed by linear or nonlinear interpolation using a few closest points. In one embodiment, a distance-based interpolation on a triangle is used to map every node on three lines of a gamut surface triangle.

Finally, at step 214 the interior points of the source gamut are processed by interpolations.

Although specific embodiments have been illustrated and described herein, it will be appreciated by those of ordinary skill in the art that a variety of alternate and/or equivalent implementations can be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of transferring colors between color devices, the method comprising:
    establishing a source color gamut for a source device, the source color gamut having a white point, a black point, and primary points;
    establishing a destination color gamut for a destination device, the destination color gamut having a white point, a black point, and primary points;
    performing white and black point adaptation such that the source white point is mapped to the destination white point and the source black point is mapped to the destination black point, thereby establishing adapted white and black points;
    processing neutral points from the source color gamut to the destination color gamut;
    determining aimed primary points on an aimed gamut surface of an aimed gamut from the source and destination primary points, the destination gamut, and color preference;
    mapping important lines, using the determined aimed primary points, from the source gamut to the destination gamut;
    mapping gamut surface points from the source gamut to the destination gamut using the mapped important lines; and
    processing interior points of the source gamut surface.

2. The method of claim 1, wherein mapping important lines further comprises mapping nodes between the white point and each of the six primaries, nodes between the black point and each of the six primaries, and nodes between two neighbor primaries.

3. The method of claim 2, wherein mapping gamut surface points further comprises mapping gamut surface points from the source gamut to the destination gamut using the nodes between the white point and each of the six primaries, the nodes between the black point and each of the six primaries, and the nodes between two neighbor primaries.

4. The method of claim 3, wherein computing hue rotation further comprises constructing a one-dimensional lookup table for hue rotation of the aimed primary points.

5. The method of claim 4, wherein computing hue rotation further comprises converting LAB values of the source and aimed primaries into LCh.

6. The method of claim 5, wherein computing hue rotation for each of the six source primary hue angles further comprises computing the aimed hue angle minus the source hue angle at the primary.

7. The method of claim 3 wherein mapping gamut surface points further comprises designating twelve triangles and processing node points on the destination gamut surface by interpolating in each triangle.

8. The method of claim 7 further comprising computing LAB values of a node by interpolation using a three closest points in each triangle.

9. The method of claim 8 further comprising computing LAB values of a node by a distance-based interpolation on each triangle.

10. A system for rendering colors between color devices, the system comprising:
    a source color device having a source color gamut with a white point, a black point, and primary points;
    a destination color device having a destination color gamut with a white point, a black point, and primary points; and
    a processing device coupled between the source color device and the destination color device;
    wherein the processing device is configured to perform white and black point adaptation such that the source white point is mapped to the destination white point and the source black point is mapped to the destination black point, thereby establishing adapted white and black points, to determine aimed primary points from a combination of the source and destination primary points, the destination gamut, and color preference, to map important lines from the source gamut to the destination gamut using the aimed primary points, to map gamut surface points from the source gamut to the destination gamut using the mapped important lines, and to process interior points of the source gamut surface.

11. The system of claim 10, wherein the processing device is further configured to map the source gamut surface to a destination gamut by geometrically reshaping.

12. The system of claim 11, wherein the processing device is further configured to map nodes between the white point and each of the six primaries, map nodes between the black point and each of the six primaries, and to map nodes between two neighbor primaries.

13. The system of claim 12, wherein the processing device is further configured to map gamut surface points from the source gamut to the destination gamut using the nodes between the white point and each of the six primaries, the nodes between the black point and each of the six primaries, and the nodes between two neighbor primaries.

14. The system of claim 13, wherein the source color device is a color monitor and wherein the destination color device is a color printer.

15. The system of claim 14, wherein the source color gamut and wherein the destination color gamut is established in a luminance-chrominance color space, such as CIE LAB, CIE Luv, CIECAM07s JAB, CIECMA02 JAB color space.

16. The system of claim 15, wherein the primary points include a red point (R), a green point (G), a blue point (B), a cyan point (C), a magenta point (M), and a yellow point (Y) and wherein the aimed primary points include a red point (r), a green point (g), a blue point (b), a cyan point (c), a magenta point (m), and a yellow point (y).

17. The system of claim 16, wherein the processing device is further configured to perceptual map the source white point to the destination white point and the source black point to the destination black point.

18. The system of claim 17, wherein aimed primary points are determined before mapping the source gamut surface points.

19. A method of transferring color images between color devices, the method comprising:

establishing a source color gamut for a source device, the source color gamut having a white point, a black point, and primary points;

establishing a destination color gamut for a destination device, the destination color gamut having a white point, a black point, and primary points;

performing white and black point adaptation such that the source white point is mapped to the destination white point and the source black point is mapped to the destination black point, thereby establishing adapted white and black points;

processing neutral points from the source color gamut to the destination color gamut;

determining aimed primary points on an aimed gamut surface of an aimed gamut from the source and destination primary points, the destination gamut, and a color preference;

computing hue rotation for the aimed primary points;

mapping, from the source gamut to the destination gamut, nodes between the white point and each of the six primaries, nodes between the black point and each of the six primaries, and nodes between two neighbor primaries;

mapping gamut surface points from the source gamut to the destination gamut using the nodes between the white point and each of the six primaries, the nodes between the black point and each of the six primaries, and the nodes between two neighbor primaries; and processing interior points of the source gamut surface.

20. The method of claim 19, wherein computing hue rotation further comprises constructing a one-dimensional lookup table for hue rotation of the aimed primary points.

21. The method of claim 20, wherein computing hue rotation further comprises converting LAB values of the source and aimed primaries into LCh.

22. The method of claim 21, wherein computing hue rotation for each of the six source primary hue angles further comprises computing the aimed hue angle minus the source hue angle at the primary.

23. The method of claim 22 wherein mapping gamut surface points further comprises designating twelve triangles and processing node points on the destination gamut surface by interpolating in each triangle.

24. The method of claim 23 further comprising computing LAB values of a node by interpolation using a three closest points in each triangle.

25. The method of claim 24 further comprising computing LAB values of a node by a distance-based interpolation on each triangle.

* * * * *